May 8, 1951          V. C. DAVIS          2,552,088
WATER DETECTOR ALARM CIRCUIT FOR LUBRICATING SYSTEMS
Filed March 8, 1949
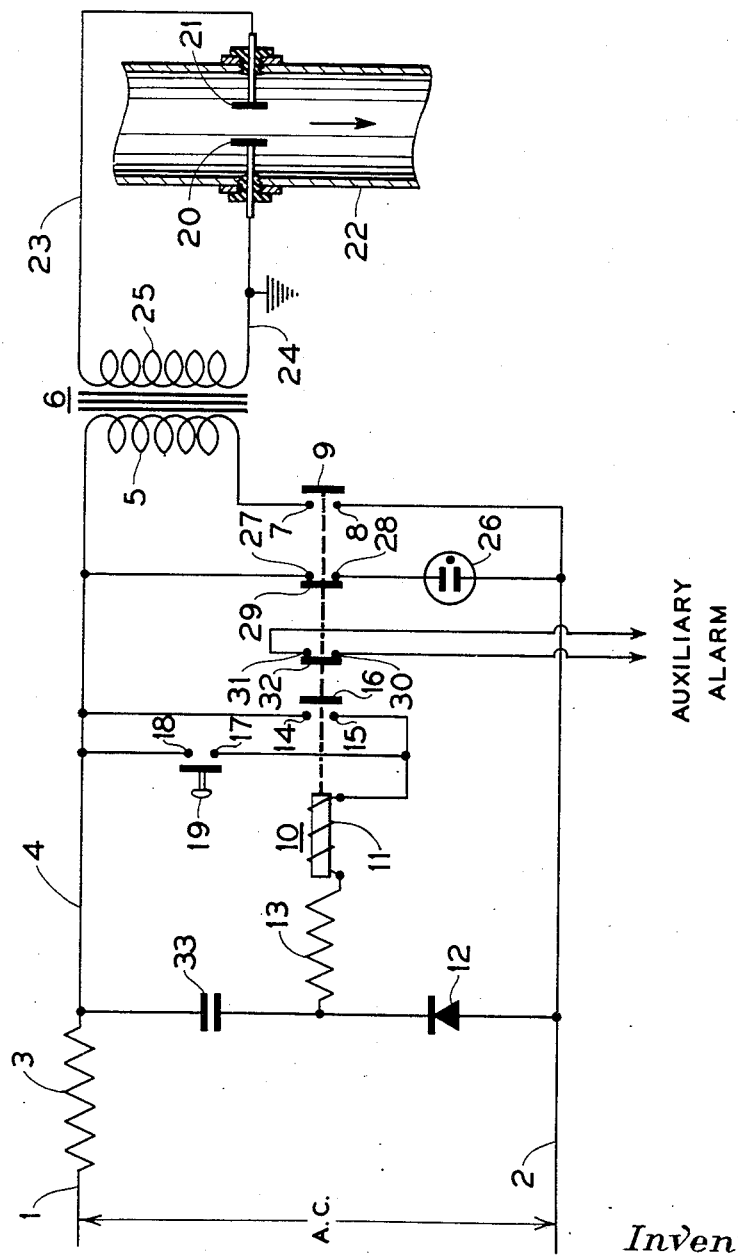
Inventor
VINCENT C. DAVIS
by
Attorneys Patented May 8, 1951

2,552,088

UNITED STATES PATENT OFFICE 2,552,088

WATER DETECTOR ALARM CIRCUIT FOR LUBRICATING SYSTEMS

Vincent C. Davis, Oakland, Calif., assignor to California Research Corporation, San Francisco, Calif., a corporation of Delaware Application March 8, 1949, Serial No. 80,234

6 Claims. (Cl. 177—311)

1

The present invention relates to alarm systems and, more particularly, to an electrical alarm system for detecting and indicating the presence of water in an oil stream.

It has been known heretofore that the insulating properties of oil may be used to detect the presence of water or other impurities in an oil bath, or tank, by using a pair of electrodes immersed in the oil and then placing a source of high potential across the electrodes. However, these water-detecting devices have been used only where it is desirable to maintain a relatively high dielectric fluid around a high potential device such as a transformer or circuit breaker. Since that type of apparatus will operate with a considerable amount of contamination or water in the insulating oil, due to other insulation that acts independently of the oil bath, it has not been necessary to provide an accurate detector system for indicating the presence of very small amounts of contaminant.

In the field of lubrication of modern internal combustion engines and other high-speed rotating equipment, it has become very important to know exactly when the lubricating oil has become contaminated to such an extent that the oil must be changed or cleaned so that serious damage to the apparatus can be avoided. This is particularly true with modern, compounded, lubricating oils used in the lubrication of internal combustion engines wherein a number of undesirable effects are known to result from the presence of a small amount of water in the oil. Among these undesirable effects is that of the water selectively attacking the compounding material in the lubricating oil to form acids which will react with the metal in the engine or lubricating system to cause corrosion and rusting. It is also known that water will cause the compounding material to be precipitated from the lubricating oil so that the oil becomes essentially of the non-compounded type. Other effects are those of raising the pour point of the liquid and substantially increasing the viscosity of the lubricating oil so that the desired lubrication cannot be obtained with the contaminated lubricant.

It will be readily appreciated that the likelihood of water contamination in internal combustion engines is much greater than where oil is used as an insulating medium, since as a lubricant the oil is usually in a heat exchange relationship with cooling water for the engine and generally the water and oil are only prevented from intermixing by gaskets and gasket cement.

2

Due to this greatly increased danger of contamination, it is essential that a rapid and accurate indication of the presence of water in lubricating oil be provided.

It is therefore an object of the present invention to provide a water detector and alarm circuit capable of rapidly and accurately determining the presence of a small amount of water in a lubricating system.

It is a further object of this invention to provide a water detection system for a lubricating stream capable of differentiating between a momentary disturbance in the dielectric strength of the oil and the continued presence of an amount of water or other contaminant sufficient to indicate the desirability of changing the oil.

Further objects and advantages of the present invention will become apparent from the following specification taken in conjunction with the accompanying drawing.

In the drawing, a schematic representation of a circuit constructed in accordance with the present invention is shown in which a pair of electrodes are placed across a lubricating feed line such as that used in an internal combustion engine lubricating system.

With reference to the drawing, a suitable source of alternating current is supplied to the circuit through lines 1 and 2. In series with line 1, a resistor 3 is connected to line 4 which in turn is connected to the primary winding 5 of transformer 6. The opposite terminal of primary 5 is adapted for connection to line 2 through a pair of contacts 7 and 8 which may be closed by contactor 9 located on the armature of a relay 10.

Coil 11 of relay 10 is adapted to be placed in parallel connection across primary 5 of transformer 6 by means of rectifier 12 connected to line 2, a series resistor 13, and a starting-lock-in circuit provided by either contacts 14 and 15 which may be closed by contactor 16, or contacts 17 and 18 adapted to be closed by a manually-operable contactor 19, to connect coil 11 to line 4. In this manner, it will be apparent that when coil 11 of relay 10 is actuated by depressing contactor 19, both primary winding 5 of transformer 6 and coil 11 of relay 10 will be in parallel across lines 2 and 4, and that both the relay and the transformer will be in series with resistor 3.

In order to measure the dielectric constant of the lubricating oil under observation, a pair of electrodes 20 and 21 are located in a flowing oil stream such as that provided by pipe 22; and a high potential source of alternating current is applied between electrodes 20 and 21 and across the oil stream by a pair of lines 23 and 24, which are connected to opposite ends of secondary winding 25 of the transformer 6. Preferably, although not necessarily, one of the lines between the transformer and one of the electrodes may be grounded, as shown in the drawing.

As shown, an alarm device such as a neon glow lamp 26 is adapted to be connected across lines 2 and 4 by a pair of contacts 27 and 28 which may be closed by contactor 29 located on the armature of relay 10. In order to provide an auxiliary alarm circuit such as an audible alarm or means for cutting power to the input circuit, a set of contacts 30 and 31 is adapted to be closed by a contactor 32 likewise provided on the armature of relay 10. For the purpose of preventing momentary disturbances in current flow in the circuit from operating relay 10, as will be described more fully hereinafter, a condenser 33 is connected between line 4 and a point intermediate series resistor 13 and rectifier 12.

In operation, a source of alternating current is applied to lines 1 and 2 and through resistor 3 to lines 2 and 4. By manually depressing momentary contactor 19 to close contacts 17 and 18, an operating potential is applied to coil 11 of relay 10 through rectifier 12 and series resistor 13. When relay 10 is energized upon starting, the lock-in circuit provided by contacts 14 and 15 is closed by contactor 16 so that the relay coil 11 is maintained in an energized condition after contactor 19 is opened. By operation of relay 10, the primary winding 5 of transformer 6 is likewise placed across lines 2 and 4 by the closing of contactor 9 to connect points 7 and 8. At the same time, contactors 29 and 32 respectively open the circuits to neon glow lamp 26 and the auxiliary alarm (not shown) so that in normal operation, the alarm devices are not actuated.

With the primary coil 5 of transformer 6 energized, a high potential may be developed across secondary winding 25 of the transformer, and this high potential is applied across electrodes 20 and 21 located in the lubricating oil stream in pipe 22. With a normally non-conductive fluid flowing in pipe 22, the dielectric strength of the fluid is sufficient to prevent a large current from flowing between electrodes 20 and 21. Hence, the current flow in secondary winding 25 is relatively low, and likewise, the current flow through primary winding 5 is correspondingly low. With the resistance values of series resistor 13 and coil 11 of relay 10 selected to produce the desired operating potential across coil 11, but limiting the current flow through this circuit which is in parallel with the primary winding of transformer 6, it will be apparent that only a small current flows through series resistor 3 between lines 1 and 4. However, when contaminating material such as water enters the fluid stream in pipe 22, the resistance value of the dielectric between electrodes 20 and 21 is reduced so that a greater current flows in lines 23 and 24 and the secondary coil 25 of transformer 6. Under this condition, the primary winding of the transformer draws a substantial current which in turn produces a large IR drop across resistor 3 and substantially reduces the operating potential between lines 2 and 4 and through the parallel circuit formed by rectifier 12, series resistor 13, and coil 11 of relay 10. When the IR drop becomes sufficient to reduce the potential across coil 11, relay 10 will become de-energized and hence will operate contactors 29 and 32 to energize neon indicator lamp 26 and the auxiliary alarm, and at the same time open the energizing circuit to the primary winding 5 of transformer 6. In order to minimize the tendency for small disturbances in the dielectric strength of the fluid flowing in pipe 22 from causing relay 10 to become de-energized, condenser 33 is connected between line 4 and a point between rectifier 12 and series resistor 13. Condenser 33 has sufficient capacitance so that it may become charged to a potential sufficient to maintain an operating potential across coil 11 of relay 10 even though the normal operating potential between lines 2 and 4 becomes momentarily less than that required to maintain the relay in an energized condition. It will be obvious to those skilled in the art that the capacitance of condenser 33 may be selected to prevent deenergization of coil 11 for any desired time interval when the potential between wires 2 and 4 is below the value needed to normally energize coil 11.

From the foregoing description, it will be apparent that the present invention provides means for rapidly and positively detecting a small amount of contaminant in a lubricating fluid by continuously measuring the dielectric strength of the lubricating oil stream and using this measured value to operate an alarm system.

It will be apparent to those skilled in the art that various modifications and changes may be made in the above-described system without departing from the scope of the invention, and I therefore intend to limit the invention only within the scope of the appended claims.

I claim:

1. In a water detector alarm system for an oil stream comprising a source of alternating current, a transformer having a primary winding connected to said source, a pair of spaced electrodes located in said oil stream and connected across the secondary of said transformer, and switch means for connecting alarm means to a source of power in response to a predetermined flow of current between said electrodes, a relay operating circuit for said switch means comprising a series resistor connected between said current source and said transformer, a current sensitive direct current relay coil having a rectifier connected in series therewith adapted to be connected in parallel with said transformer primary between said series resistor and said transformer whereby said switch means may be operated by a predetermined current flow in said series resistor due to the flow of current between said electrodes.

2. In a water detector alarm system for an oil stream, said system having an electrically actuated alarm, a transformer with a primary winding adapted to be supplied through a series resistor with alternating current, and a secondary winding shunted by a pair of spaced electrodes immersed in said oil stream, means comprising a rectifier, a current-sensitive relay having a coil connected in series with said rectifier and both in parallel directly across the primary winding of said transformer, and a pair of contacts operable by said relay for connecting said alarm to its electric power supply when the current flow in said series resistor and said transformer primary winding reaches a predetermined value as the result of increased current flow in the transformer secondary winding due to the presence of water between said electrodes in said oil stream.

3. In a water detector alarm system according to claim 2, the addition of a capacitor connected in parallel with said current sensitive relay coil for introducing a time delay in said relay operation to prevent operation of said alarm when transient changes in current flow between said electrodes occur.

4. In a water detector alarm system for an oil stream in an indirect heat-exchange relationship to a body of water comprising a source of alternating current, a transformer connected to said source for applying a high potential to a pair of electrodes located in said stream, said electrodes being connected across the secondary of said transformer and alarm means connectible to an electric power source when the current flow between said electrodes exceeds a predetermined value, a relay operating means for said alarm means comprising a resistor connected in series between said source and a terminal of the primary winding of said transformer, a parallel circuit, including the coil of a relay and a rectifier in series therewith, connected across said primary winding, said relay coil being responsive to the IR drop in said series resistor to thereby connect said alarm means to said power source when said predetermined current flows between said electrodes and condenser means in parallel with said relay coil to prevent transient disturbances in the dielectric constant of said oil from operating said alarm means.

5. In a water detector alarm system for a lubricating oil stream of a water-cooled internal combustion engine wherein said oil is in an indirect heat-exchange relationship to said water including a source of alternating current, a transformer connected to said source, a pair of spaced electrodes located in said oil stream and connected to a high potential winding of said transformer and alarm means operable in response to a predetermined increase in current flow between said electrodes due to water in said oil stream, relay circuit means for operating said alarm means comprising a rectifier, a potential sensitive D. C. relay having a coil connected in series therewith and both connected as a parallel circuit across the low potential side of said transformer, and a series resistor connected between said source and said parallel circuit whereby an increased current flow through said transformer will cause an IR drop in said series resistor to reduce the potential across the coil of said relay to de-energize said relay and thereby operate said alarm means.

6. In a water detector alarm system for a lubricating oil stream of a water-cooled internal combustion engine wherein said oil is in an indirect heat-exchange relationship to said water including a source of alternating current, a transformer connected to said source, a pair of spaced electrodes located in said oil stream and connected to a high potential winding of said transformer and alarm means operable in response to a predetermined increase in current flow between said electrodes due to water in said oil stream, time delay relay means for operating said alarm means comprising a parallel circuit including a relay having its coil connected in series with a rectifier and a capacitor in parallel with said coil to prevent de-energization of said coil due to transient decreases in potential across said coil connectible across the terminals of the primary winding of said transformer and a series resistor connected between said source of alternating current and one of said terminals whereby a predetermined increase in current flow in said primary winding due to the presence of water between said electrodes will reduce the operating potential in said parallel circuit and thereby de-energize said relay to operate said alarm means after a pre-determined time delay.

VINCENT C. DAVIS.

REFERENCES CITED

The following references are of record in the file of this patent:

UNITED STATES PATENTS

| Number | Name | Date |
| --- | --- | --- |
| 1,320,036 | Crockatt | Oct. 28, 1919 |
| 2,261,495 | Ewertz | Nov. 4, 1941 |
| 2,295,927 | Botteron | Sept. 15, 1942 |